Figure 5:
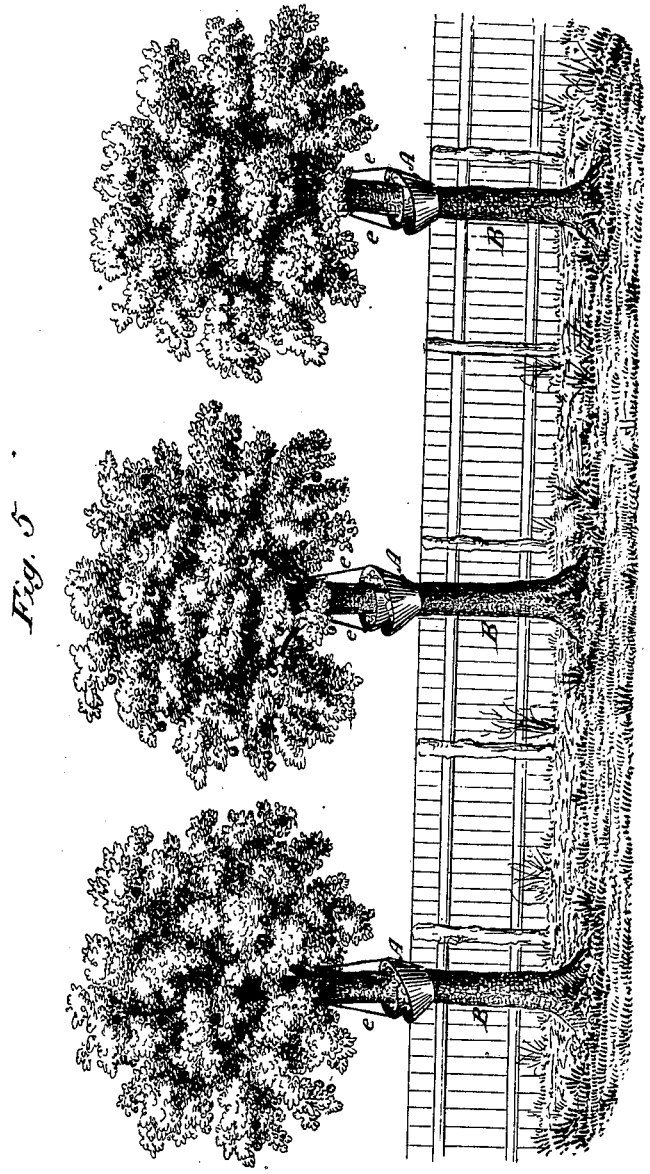

2 Sheets—Sheet 1.
J. A. HEADINGTON.
Device for Protecting and Irrigating Fruit-Trees.
No. 197,363.      Patented Nov. 20, 1877.
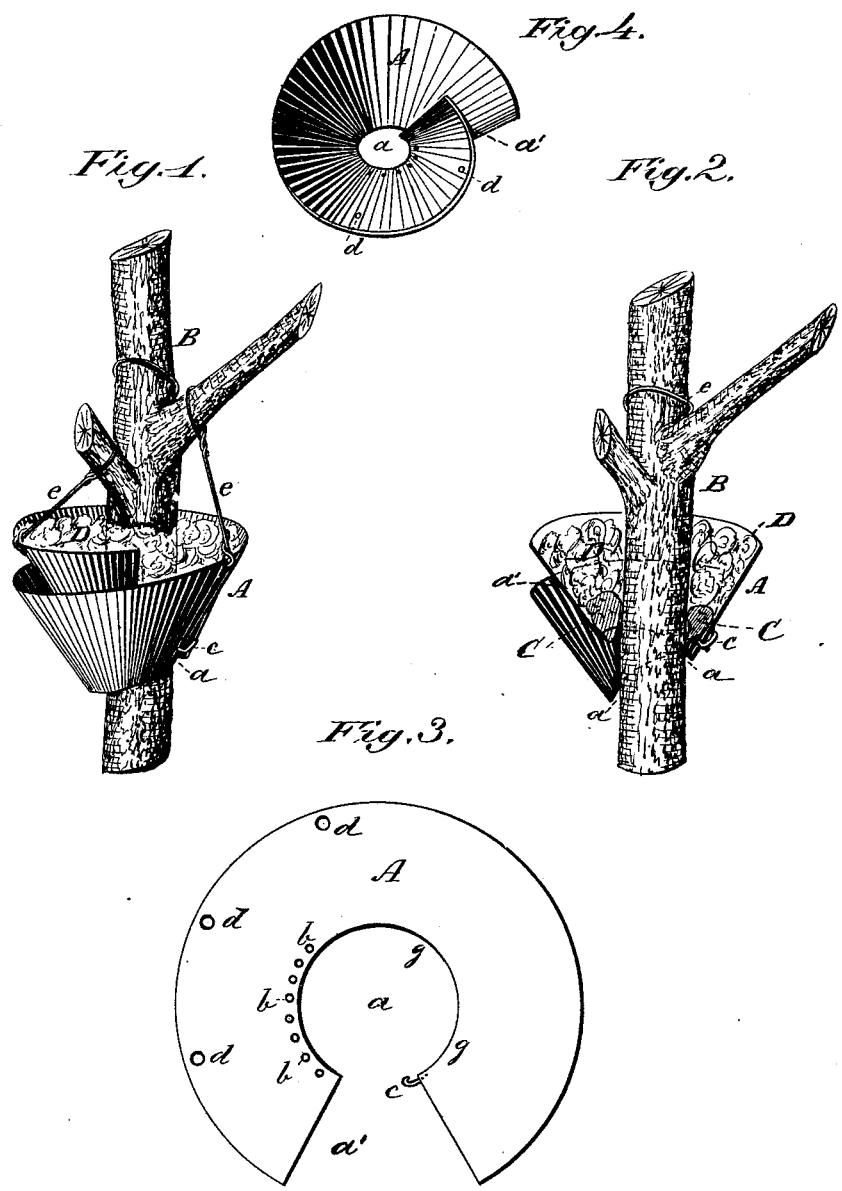
Attest:
E. E. Court
Jno. R. Brooks
Inventor:
Joel A. Headington,
by C. A. Snow & Co.
his Attorneys.
N. PETERS, PHOTO-LITHOGRAPHER, WASHINGTON, D. C.

2 Sheets—Sheet 2.

J. A. HEADINGTON.
Device for Protecting and Irrigating Fruit-Trees.

No. 197,363. Patented Nov. 20, 1877.

Attest:
E. E. Court
Jno. P. Brooks.

Inventor:
Joel A. Headington,
by C. A. Snow & Co.
his Attorneys.

UNITED STATES PATENT OFFICE.

JOEL A. HEADINGTON, OF MEXICO, MISSOURI.

IMPROVEMENT IN DEVICES FOR PROTECTING AND IRRIGATING FRUIT-TREES.

Specification forming part of Letters Patent No. 197,363, dated November 20, 1877; application filed August 31, 1877.

*To all whom it may concern:*

Be it known that I, JOEL A. HEADINGTON, of Mexico, in the county of Audrain and State of Missouri, have invented certain new and useful Improvements in Devices for Protecting and Invigorating Fruit and Ornamental Trees; and I do hereby declare that the following is a full, clear, and exact description thereof, which will enable others skilled in the art to which it appertains to make and use the same, reference being had to the accompanying drawings, which form a part of this specification, and in which—

Figure 1 represents, in perspective, a section of the trunk of a tree which is supplied with my device. Fig. 2 is a vertical section of the device or apparatus as applied. Fig. 3 is a plan view of the flat piece or blank from which, by coiling it into a funnel shape, my device or apparatus is made. Fig. 4 is a top view of the apparatus partly opened out to place it in position around the trunk of a tree, and Fig. 5 represents trees to which my invention has been applied.

Similar letters of reference indicate corresponding parts in all the figures.

My invention relates to devices for preventing the destruction of fruit and ornamental trees by borers, caterpillars, and other injurious insects; and it consists in the construction and arrangement of a device which may be easily applied to any tree regardless of its size, which may be manufactured and supplied at a small cost, so as to place it within the reach of all farmers and fruit-growers; and which shall serve also as an invigorator for the tree, making the bark smooth and glossy, and the tree healthy and vigorous, substantially as hereinafter more fully explained.

In the drawing, A is a funnel-shaped basin, made by twisting the blank represented in Fig. 3 into a cone shape, or cone spiral, open at the bottom, as shown at $a$, and having a slit or opening on one side, as shown at $a'$. Along the inner edge of the curved plate A are punched a series of holes, $b\ b\ b$, and to either of the inner corners is secured a bent pin, hook, or staple, $c$, which fits into the perforations $b$. Along the upper rim are punched three or more holes, $d\ d\ d$, into which cords or wires $e\ e\ e$ are inserted, which are secured upon the lower branches of the tree, or upon nails driven into the trunk, by means of which the basin is suspended, encircling the trunk, as shown in the drawing.

The perforations $b$ permit hook $c$ to be shifted or adjusted, so as to make the bottom hole or opening $a$, through which the trunk passes, large or small, so that the same apparatus may be used on trees varying in size, or adjusted to conform to the gradual growth of the tree. An annular space should always be left open between the lower rim $g$ of the basin and the trunk B, to allow the impregnated water to trickle down along the bark and reach the roots.

To use this device, the basin is first placed in position on the tree to be protected, as shown in the drawing. A few pieces of chemical or medicated soap C are then wrapped in loose cotton, wool, or other fibrous material, or wrapped in bandages, and packed closely around the trunk in the bottom of the basin. Upon the top of this, cotton or wool is packed loosely, as shown at D in the drawing, and the apparatus is ready.

The process is as follows: The rain and moisture trickling down the tree will be intercepted and gathered by the basin, where it will soak down through the cotton and into the soap, dissolving a portion of it, which trickles slowly down through the annular opening $a$, thereby thoroughly washing the bark. The soap-water settles about the root of the tree, where the soap, after evaporation of the water, will form a thin glazing or covering, through which the borers will not penetrate; and the cotton or bandages in the bottom of the basin, being kept continually moist with the soapy solution, will form a circular barrier through or over which worms, ants, or other insects cannot penetrate. Any kind of chemical soap may be used, and, being wrapped or bandaged up in the cotton or wool, will last a long time; or pieces of soda, borax, pitch, or other insect and vermin repellent material may be used in the basin, instead of the soap, to form a solution, which will not only repel or kill the insects and destroy the eggs, but invigorate the tree itself by being absorbed into its pores. Every shower of rain will wash and cleanse the tree thoroughly, and the solution penetrating the earth around the roots will effectively prevent the approach of borers, without the least danger or injury to the tree.

The circular or segmental disk or plate A, which forms the cone-shaped basin, may be made of tin, water-proof paper, leather, rubber, or any other suitable material.

Having thus described my invention, I claim and desire to secure by Letters Patent of the United States—

A tree protector and invigorator consisting, essentially, of a circular or segmental plate, A, having a central annular opening, $a$, and slit $a'$, and twisted spirally, so as to form an adjustable cone or funnel shaped basin, which may be suspended upon the trunk by wires $e$, or other suitable means, in combination with the chemical or medicated soap C, or its equivalent, and the cotton, wool, or other packing, substantially as and for the purpose hereinbefore set forth.

In testimony that I claim the foregoing as my own I have hereto affixed my signature in presence of two witnesses.

JOEL ALEXANDER HEADINGTON.

Witnesses:
PINKNEY FRENCH,
JOHN MAUPIN GONDON.